Patented June 23, 1953

2,642,956

UNITED STATES PATENT OFFICE 2,642,956

METHOD OF REMOVING ACETYLENE FROM GASEOUS MIXTURES

Robert C. Bour, Chicago, Ill., assignor to National Cylinder Gas Company, Chicago, Ill., a corporation of Delaware No Drawing. Application November 23, 1944, Serial No. 564,904

11 Claims. (Cl. 183—115)

This invention relates to a process for removal of acetylene from gases containing the same by means of a solvent for acetylene. The absorption of acetylene in acetone is well known and it has also been proposed to use acetonitrile as a washing agent for gases containing acetylene. Both these solvents have the disadvantage of being easily vaporized so that the subsequent separation of acetylene from the solvents by distillation presents certain difficulties and it becomes necessary to undertake further operations to remove the entrained solvent vapors from the final product.

It is therefore an object of the present invention to provide a process for selective extraction of acetylene from gases containing the same by means of solvents that are not easily vaporized or entrained with acetylene.

Other and further objects and features of the present invention will become apparent from the following description and appended claims.

According to my invention, I employ an ester of phosphoric acid as an absorbent for the removal of acetylene from gases containing acetylene. More specifically, I employ ester of phosphoric acid derived from alcohols containing less than six carbon atoms such as trimethyl phosphate, triethyl phosphate, tri-isopropyl phosphate, triamyl phosphate, trihexyl phosphate, or tribenzyl phosphate. Trimethyl phosphate is preferred.

These esters of phosphoric acid are characterized by high solvent powers for acetylene with low solubility for other gases, high boiling points and low vapor pressures at ordinary temperatures, stability at the boiling point, and no reactivity with acetylene or other gases such as hydrogen, methane or olefines.

According to the invention, gases containing acetylene such as cracked hydrocarbons are brought into contact in any desired manner, at any suitable temperature, preferably cooled, and with or without pressure, with one or more of the above disclosed phosphate esters. The acetylene is absorbed and may be recovered by heating and/or reducing the pressure on the solvent.

Many details of procedure and composition may be varied within a wide range without departing from the principles of this invention and it is therefore not my purpose to limit the patent granted on this invention otherwise than necessitated by the scope of the appended claims.

I claim as my invention:

1. The process of recovering acetylene from gases containing the same which includes the step of scrubbing said gases with a liquid predominantly comprising an ester of phosphoric acid derived from an alcohol containing not more than 6 carbon atoms.

2. The process of recovering acetylene from gases containing the same which includes the step of scrubbing said gases with trimethyl phosphate.

3. The process of recovering acetylene from gases containing the same which includes the step of scrubbing said gases with triethyl phosphate.

4. The process of recovering acetylene from gases containing the same which includes the step of scrubbing said gases with tri-isopropyl phosphate.

5. The method of effecting the selective separation and recovery of acetylene from gaseous mixtures containing acetylene and other hydrocarbon gases which comprises bringing the gases into intimate contact with an ester of phosphoric acid derived from an alcohol containing not more than six carbon atoms thereby effecting selective absorption of the acetylene from the gases, and subsequently heating the resulting solution to expel absorbed acetylene therefrom.

6. The method of effecting the selective separation and recovery of acetylene from gaseous mixtures containing acetylene and other hydrocarbon gases which comprises bringing the gases into intimate contact with trimethyl phosphate thereby effecting selective absorption of the acetylene from the gases, and subsequently heating the resulting solution to expel absorbed acetylene therefrom.

7. The method of effecting the selective separation and recovery of acetylene from gaseous mixtures containing acetylene which comprises bringing the gases into intimate contact with triethyl phosphate thereby effecting selective absorption of the acetylene from the gases, and subsequently heating the resulting solution to expel absorbed acetylene therefrom.

8. The method of effecting the selective separation and recovery of acetylene from gaseous mixtures containing acetylene which comprises bringing the gases into intimate contact with tri-isopropyl phosphate thereby effecting selective absorption of the acetylene from the gases, and subsequently heating the resulting solution to expel absorbed acetylene therefrom.

9. The method of effecting the selective separation and recovery of acetylene from gaseous mixtures containing acetylene and other hydrocarbon gases, which comprises contacting said gaseous mixtures under pressure with an ester of phosphoric acid derived from an alcohol containing not more than 6 carbon atoms, thereby effecting a selective absorption of acetylene from said gases, and reducing the pressure to liberate said acetylene.

10. In a process for increasing the acetylene content of gaseous mixtures containing the same, the step which comprises selectively dissolving the acetylene in a trialkyl phosphate in which each alkyl group contains from 1 to 4 carbon atoms.

11. In a process for increasing the acetylene content of gaseous mixtures containing the same, the step which comprises selectively dissolving the acetylene in triethyl phosphate.

ROBERT C. BOUR.

References Cited in the file of this patent

UNITED STATES PATENTS

| Number | Name | Date |
|---|---|---|
| 1,854,141 | Horsley | Apr. 12, 1932 |
| 1,882,978 | Schmidt et al. | Oct. 18, 1932 |
| 1,900,655 | Metzger | Mar. 7, 1933 |
| 1,966,088 | Taylor | Apr. 2, 1935 |
| 2,139,000 | Cohen | Dec. 6, 1938 |
| 2,146,448 | Scott | Feb. 7, 1939 |
| 2,162,963 | McKittrick | June 20, 1939 |
| 2,246,297 | Duncan et al. | June 17, 1941 |

FOREIGN PATENTS

| Number | Country | Date |
|---|---|---|
| 548,733 | Great Britain | Oct. 22, 1942 |